March 18, 1947.     G. PROVENZANO     2,417,612

MILITARY TANK FOR SALVAGING AEROPLANES

Filed July 23, 1945

INVENTOR.
Gaetano Provenzano
BY
ATTORNEY

Patented Mar. 18, 1947

2,417,612

UNITED STATES PATENT OFFICE 2,417,612

MILITARY TANK FOR SALVAGING AEROPLANES

Gaetano Provenzano, New York, N. Y.

Application July 23, 1945, Serial No. 606,586

3 Claims. (Cl. 214—85)

This invention relates to an improved military tank or tractor and one of its objects is to provide a vehicle of this type with means for lifting and hauling a disabled aeroplane for salvage purposes, or for any other desired purpose.

Another object of the invention is to provide the body of a military tractor or tank with an overhead platform and a ramp leading from the ground level thereto, and further to provide a simple hauling arrangement, whereby the motor or power plant of the tractor may be utilized to lift a disabled aeroplane or move it on the ramp and onto the overhead platform, so that the tractor may then convey the aeroplane to any desired field or repair depot, or otherwise relocate it.

With the above and other objects in view the invention consists in certain new and useful combinations, constructions, and arrangements of parts, clearly described in the following specification, and fully illustrated in the following drawings, in which.

Figure 1:
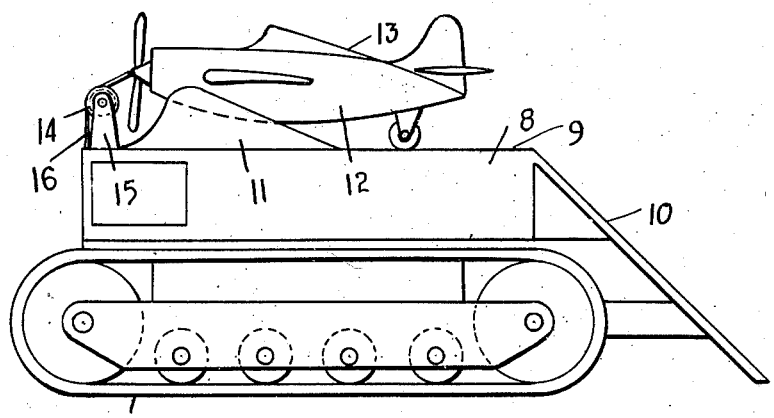
Fig. 1 is a side elevation.
Figure 2:
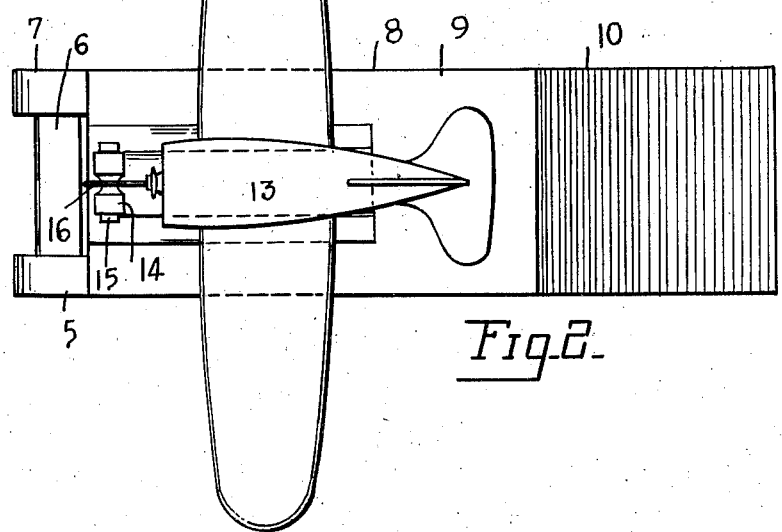
Fig. 2 is a top plan view.

Referring to the accompanying drawings illustrating my invention 5 designates one of the endless tracks of the vehicle or tractor 6, and 7 the companion track thereof. The vehicle 6 is provided with a body 8, which is equipped with an over head platform 9, the full width of the vehicle through the endless tracks.

A ramp 10 is connected to the rear end of the platform 9, and the lower end of this ramp is located near the ground level over which the machine travels.

On the platform 9 a saddle 11 of any suitable material is mounted to receive the bottom of the fuselage 12 of the aeroplane 13. This saddle is of U-shaped construction so that it will provide a nest for the convex bottom of the fuselage 12, and prevent the aeroplane from rolling sidewise and being displaced from the military tractor or vehicle.

Forwardly of the saddle 11 a horizontal pulley 14 is mounted on the bearings 15, and over the central groove of this pulley the pull cable 18 is arranged to work. One end of this cable is suitably connected to the body of the aeroplane to be transported and the other end is engaged by a winding drum within the body of the tractor, but not shown, so that by utilizing the power plant of the tractor the aeroplane may be lifted on the ramp and placed on the saddle of the platform, so that it may be quickly conveyed to any desired location or service depot, without delay.

My invention will be found extremely useful in picking up disabled aeroplanes on battle or air fields, and moving them to locations or service depots, remote from immediate danger, where organization and equipment are available for emergency or permanent repairs and replacements.

It is understood that the overhead platform, ramp and hauling cable and pulley may be mounted on any existing military tractor, so as to combine my invention with existing equipment.

Having described my invention, I claim as new:

1. A means for loading and transporting an aeroplane comprising in combination with a military tractor having an overhead platform and a ramp leading to the rear end of the platform, a U-shaped saddle mounted on the platform and providing a nest to receive the bottom of the fuselage of the aeroplane, and means for hauling an aeroplane over the ramp and on to the saddle.

2. A means for loading and transporting an aeroplane comprising in combination with a military tractor having an overhead platform and a ramp leading to the rear end of the platform from the ground level, a U-shaped saddle mounted on the platform near the forward end thereof, a grooved pulley mounted on the platform forwardly of the saddle, and a hauling cable connectable at one end to the aeroplane to be hauled and to winding means in the body of the tractor and arranged to move against the grooved pulley, so that the power plant of the tractor can be utilized to haul the aeroplane over the ramp and on to the saddle.

3. In combination with a military wheeled vehicle comprising a body having therein power driven means, a means for loading an aeroplane to be transported comprising a platform having its top above said body so that the wings of the aeroplane when loaded will be well clear of and above said body, a relatively high pulley on the front of the platform, a ramp rigid with the rear end of the platform so that the aeroplane may be drawn up said ramp, the latter having its rear portion spaced from the ground so that the vehicle may at once travel with its load, and flexible means leading from said power driven and attached to the front end of the aeroplane, said flexible means passing over said pulley.

GAETANO PROVENZANO.

REFERENCES CITED

The following references are of record in the file of this patent:

UNITED STATES PATENTS

| Number | Name | Date |
|---|---|---|
| 2,364,365 | Hultquist | Dec. 5, 1944 |
| 1,803,320 | Christianson | May 5, 1931 |
| 2,258,396 | LeTourneau | Oct. 7, 1941 |
| 2,135,857 | Stahl | Nov. 8, 1938 |
| 329,695 | Banta | Nov. 3, 1885 |
| 1,643,885 | Gill | Sept. 27, 1929 |
| 2,318,802 | Reid | May 11, 1943 |

FOREIGN PATENTS

| Number | Country | Date |
|---|---|---|
| 571,803 | French | Feb. 8, 1924 |